Patented Apr. 22, 1930

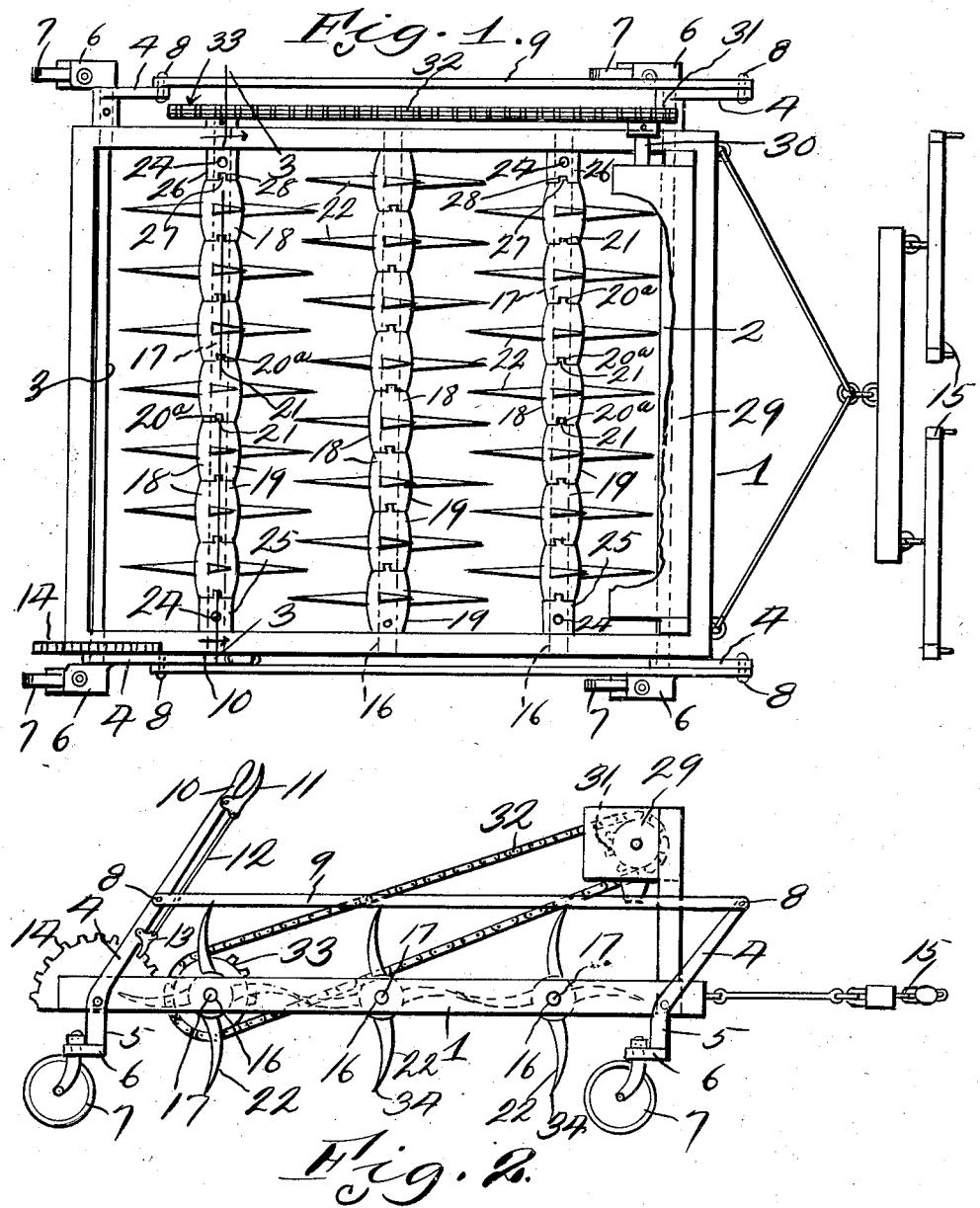

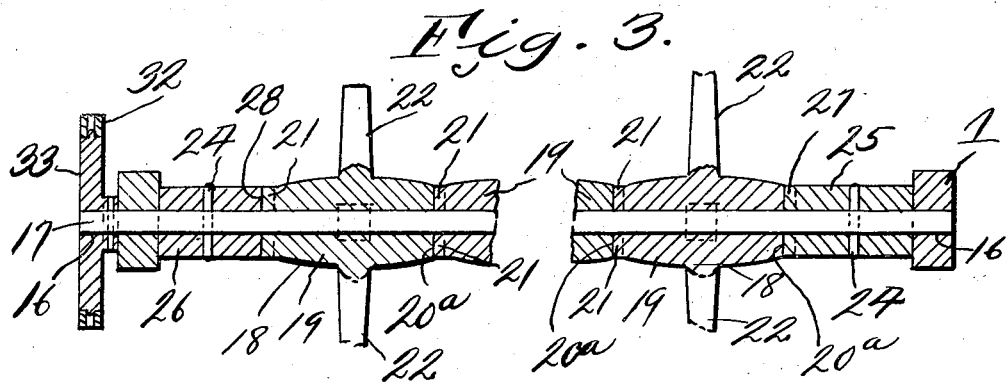
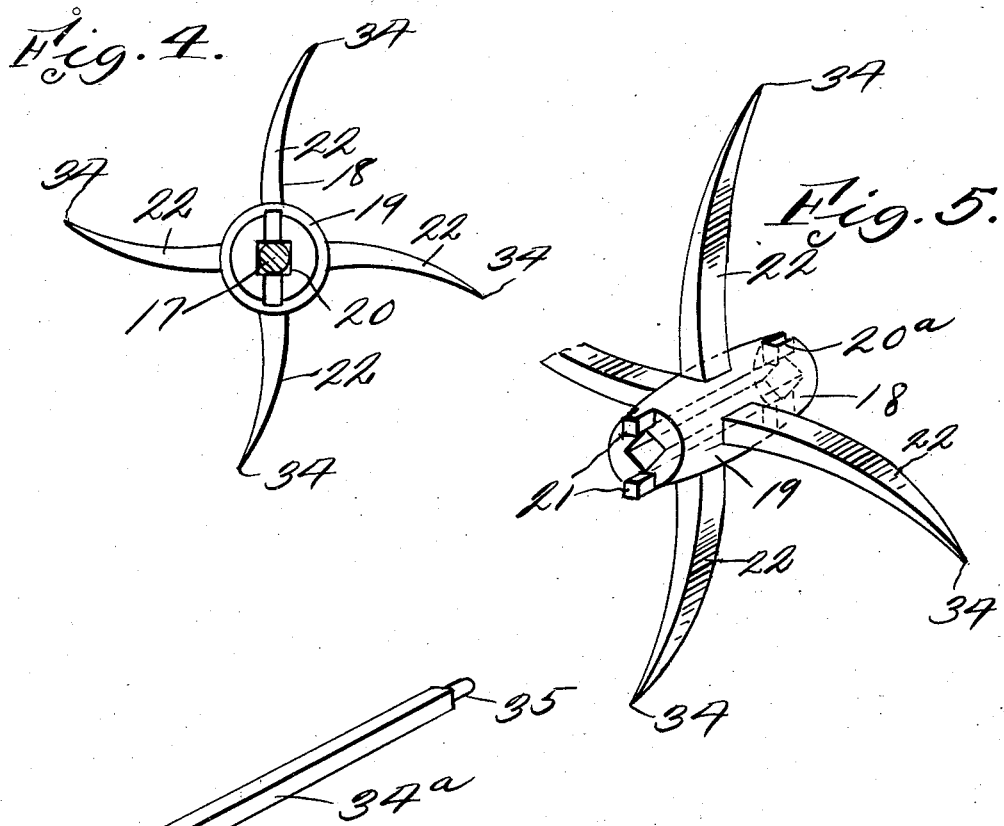

1,755,229

UNITED STATES PATENT OFFICE

HERMAN STONE, OF GREELEY, COLORADO

HARROW

Application filed April 6, 1929. Serial No. 353,086.

The invention relates to revolving harrows, and has for its object to provide a device of this character comprising a rectangular shaped frame having means in connection therewith for raising and lowering the frame in relation to the ground and rotatable members having outwardly extending cultivating arms adapted to pierce and dig into the ground as the device moves over the ground, for harrowing the same.

A further object is to stagger the teeth of the rotatable members in relation to each other, thereby insuring the cultivation of the ground over which the harrow passes.

A further object is to form the rotatable members from a plurality of hubs having lug and recess interengagement and the hubs with outwardly curved ground piercing members, preferably formed integral therewith. Also to provide the shafts with sleeves having lug interengagement and also recess interengagement with the adjacent hubs for locking the sleeves and hubs to the shafts.

A further object is to provide the hubs with square apertures extending through the same and to mount the hubs on a round shaft, thereby obviating the boring or drilling operation for a round hole through the hubs and allowing the hubs and their digging elements to be utilized on square shafts if desired.

A further object is to provide the device with a seed box and to provide driving connections between one of the shafts and the operating shaft of the seed box whereby said operating shaft will be rotated as the device moves over the ground.

A further object is to provide rock shafts at the ends of the frame having levers secured thereto and link connections between said levers at opposite sides of the frames and forming means whereby upon rocking of one of the shafts the other will be rocked for raising or lowering ground engaging wheels.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the harrow.

Figure 2 is a side elevation of the harrow.

Figure 3 is a vertical transverse sectional view on an enlarged scale, taken on line 3—3 of Figure 1.

Figure 4 is an end view of one of the rotor elements.

Figure 5 is a perspective view of one of the rotary elements.

Figure 6 is perspective view of a square shaft.

Referring to the drawings, the numeral 1 designates a horizontally disposed frame in which are rockably mounted adjacent its ends, rock shafts 2 and 3. Secured to the ends of the shafts 2 and 3 to the outside of the frame 1 are levers 4, the arms 5 of which extend downwardly and terminate in horizontal portions 6, to which conventional caster wheels 7 are pivotally connected, and it will be seen that when the wheels are moved downwardly to the positions shown in Figure 2, the frame 1 and parts carried thereby will be elevated in relation to the ground so that the device will not harrow the ground, for instance when moving the harrow from place to place. Pivotally connected at 8 to the upper ends of the levers 4 are connecting rods 9 for insuring a simultaneous movement of the levers during the raising or lowering operation. One of the levers 4 is provided with an upwardly extending handle 10 having a grip member 11 to which is connected a connecting rod 12 which controls a conventional dog 13, which in turn cooperates with a toothed segment 14 for holding the levers in adjusted positions. When the device is in use, the handle member 10 is manipulated for lowering the frame 1 to a position where the harrowing elements will pierce the ground, and it will be seen by adjusting the handle member 10 the depth of the piercing may be regulated according to the nature of the ground.

The device may be moved over the ground by any conventional means, tractor or otherwise, however for purposes of illustration, animal draft means 15 is shown.

Rotatably mounted in bearings 16 of the frame 1 are transverse shafts 17, which shafts are preferably round as shown in Figure 4, and mounted on said shafts are digging elements 18. The digging elements 18 comprise hub members 19, preferably provided with square apertures therethrough for the reception of the shaft, and at the same time allowing the digging elements to be applied to square shafts if desired. One of the ends of the hubs 19 is provided with recesses 20 for the reception of the lugs 21 carried by the adjacent ends of adjacent hubs, thereby forming an interengaging connection between the hubs whereby they are locked to rotate together, but in a manner whereby they may be easily disassembled for repair purposes, for instance when one of the curved digging elements 22 is broken or damaged, therefore replacement cost is reduced to a minimum. In the case of the central shaft 17, the hub 19, at one end thereof, has a pin connection 23 to the shaft, thereby insuring, through this single connection, the positive rotation of all of the digging elements with the shaft on which they are mounted.

The end shafts 17 have secured thereto by means of pins 24 sleeves 25 and 26. The sleeves 25 are provided with lugs 27 which engage in the recesses 20a of the adjacent hub 19 and the sleeves 26 with recesses 28 which receive the lugs 21 of the adjacent hub, therefore it will be seen that all of the digging elements are detachably locked together for insuring simultaneous rotation, are interchangeable and are locked for rotation with their shafts, therefore it will be seen that there will be a uniform harrowing of the ground as the device moves over the same. This is further insured by having the arms 22 of the adjacent harrowing elements on the adjacent shafts in staggered relation as clearly shown in Figure 1.

If desired a conventional form of seed box may be used where it is desired to deposit seed during the harrowing operation. The seed box is designated by the numeral 29, and is provided with an operating shaft 30 extending outwardly from one side thereof and provided with a drive sprocket 31 over which a sprocket chain 32 extends, and which sprocket chain extends over a sprock 33 carried by one end of one of the shafts 17, therefore it will be seen that as the shaft 17 rotates incident to the device being moved over the ground, rotation will be imparted to the seed box shaft 30 for operating the same. The digger arms 22 preferably taper to a point 34 for insuring a positive piercing of the ground, and preferably curved in the direction of rotation of the elements, thereby allowing the same to assimilate to a certain extent a digging operation.

From the above it will be seen that a harrow is provided wherein a plurality of digging elements mounted on hubs are used and which digging elements are provided with interengaging means between the hubs for insuring a simultaneous rotation, and with means cooperating with the shafts on which they are mounted for insuring a positive rotation of the digging elements with the shafts. By insuring this positive rotation with the shafts, it is obvious the square apertures through the hubs will not be worn out of rectangular form, consequently the elements will be received in a square shaft as shown in Figure 6, if desired. Where the square shaft is used, the ends thereof, which are designated by the numeral 25, are cylindrical for rotation in the bearings 16 of the frame 1. The square shaft is designated by the numeral 34a.

The invention having been set forth what is claimed as new and useful is:

A harrow comprising a frame, transverse rock shafts within the frame at opposite ends thereof, levers mounted on said shafts intermediate the ends of the levers and rotatable therewith, caster wheels carried by the lower ends of said levers, link connections between the upper ends of the levers above their pivotal points, a handle member carried by one of said levers and forming means for simultaneously rocking all of the levers and rotatable separable interengaged toothed digging elements carried by the frame.

In testimony whereof he hereunto affixes his signature.

HERMAN STONE.